United States Patent
Harty

(10) Patent No.: US 7,559,689 B2
(45) Date of Patent: Jul. 14, 2009

(54) ATTACHING IN SITU THERMAL MANAGEMENT EQUIPMENT TO HIGH PRESSURE STORAGE TANKS FOR INDUSTRIAL GASES

(75) Inventor: Ryan Douglas Roy Harty, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 11/705,970

(22) Filed: Feb. 12, 2007

(65) Prior Publication Data

US 2008/0192805 A1 Aug. 14, 2008

(51) Int. Cl.
*G01K 7/00* (2006.01)
*G01N 3/00* (2006.01)
*B65B 1/28* (2006.01)

(52) U.S. Cl. .................... 374/165; 374/46; 374/35; 141/82

(58) Field of Classification Search .............. 374/35, 374/46, 48, 49–51, 100, 116, 123, 137, 141, 374/143, 165, 166, E5.017
See application file for complete search history.

(56) References Cited

U.S. PATENT DOCUMENTS

| | | | | |
|---|---|---|---|---|
| 3,354,716 A * | 11/1967 | Wiebe et al. | ................ | 374/142 |
| 3,946,610 A * | 3/1976 | Sartorius | ................ | 374/208 |
| 4,385,197 A * | 5/1983 | Schwagerman | ........... | 136/221 |
| 4,412,090 A * | 10/1983 | Kawate et al. | ............ | 136/230 |
| 4,438,649 A * | 3/1984 | Gilman | ................ | 374/179 |
| 4,788,871 A * | 12/1988 | Nelson et al. | ............ | 73/866.5 |
| 4,848,927 A * | 7/1989 | Daily et al. | ................ | 374/208 |
| 4,925,638 A * | 5/1990 | Chakravarti et al. | .......... | 422/310 |
| 4,929,089 A * | 5/1990 | Tsuchida | ................ | 374/44 |
| 4,963,194 A * | 10/1990 | Mele | ................ | 136/221 |
| 5,004,354 A * | 4/1991 | Utton et al. | ................ | 374/29 |
| 5,192,132 A * | 3/1993 | Pelensky | ................ | 374/166 |
| 6,231,230 B1* | 5/2001 | Baldock et al. | ........... | 374/208 |
| 6,599,012 B2* | 7/2003 | Gul | ................ | 374/208 |
| 6,742,554 B1* | 6/2004 | Immel | ................ | 141/286 |
| 6,964,517 B2* | 11/2005 | Welker | ................ | 374/147 |
| 7,004,625 B2* | 2/2006 | Egidio | ................ | 374/166 |
| 7,153,023 B2* | 12/2006 | Howard et al. | ............ | 374/144 |
| 7,374,335 B2* | 5/2008 | Gotthold et al. | ........... | 374/161 |
| 7,377,294 B2* | 5/2008 | Handa | ................ | 141/82 |
| 2002/0085617 A1* | 7/2002 | Gul | ................ | 374/208 |
| 2002/0172259 A1* | 11/2002 | Bach | ................ | 374/208 |
| 2004/0161014 A1* | 8/2004 | Kofune et al. | ............ | 374/179 |
| 2004/0258130 A1* | 12/2004 | Gotthold et al. | ........... | 374/208 |
| 2007/0116090 A1* | 5/2007 | Park et al. | ................ | 374/208 |
| 2007/0246122 A1* | 10/2007 | Handa | ................ | 141/82 |

* cited by examiner

*Primary Examiner*—Patrick J Assouad
*Assistant Examiner*—Bret Adams
(74) *Attorney, Agent, or Firm*—Mark E. Duell; Porter Wright Morris & Arthur LLP

(57) ABSTRACT

A system for attaching in situ thermal management equipment, such as a heat exchanger, to a high pressure gas storage tank in a manner which fixes the in situ equipment in the interior of the tank, to the tank, but does not constrain the axial location of the in situ equipment, thereby allowing a small amount of longitudinal displacement or axial rotation between the heat exchanger and the tank. A degree of longitudinal movement along the axis of the tank and a degree of rotation is effected, both singularly at either end of the in situ device or dually at each end of the in situ device positioned within the tank.

6 Claims, 6 Drawing Sheets

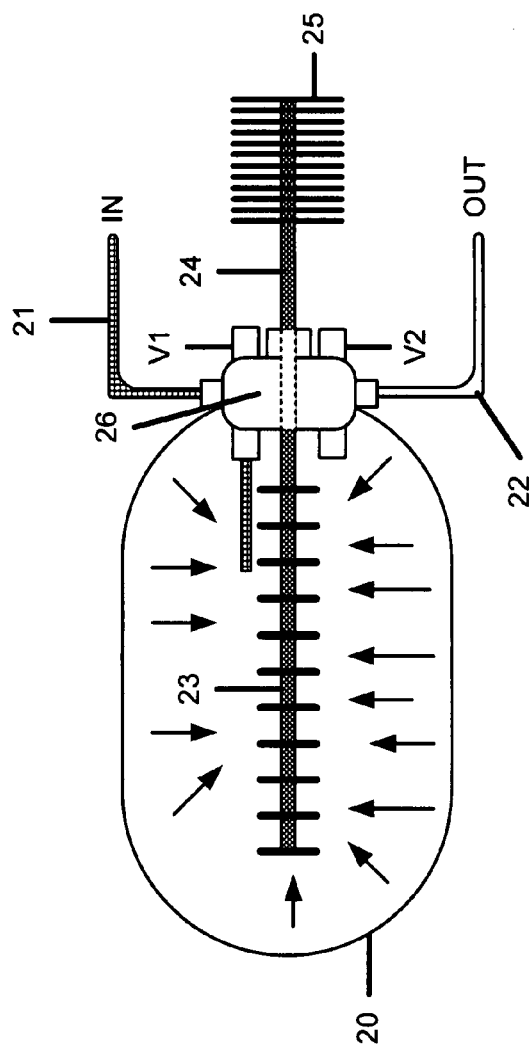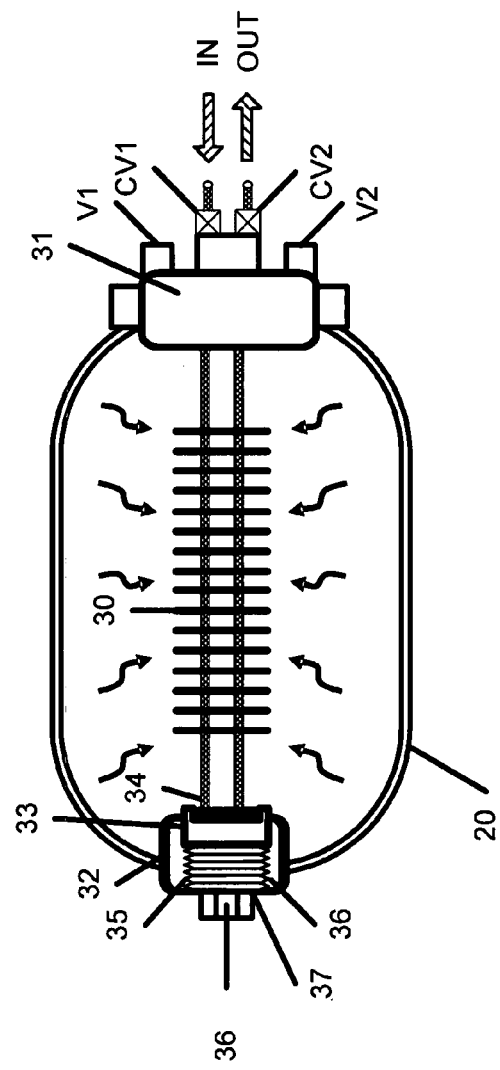
*Figure 2*
*Figure 3*

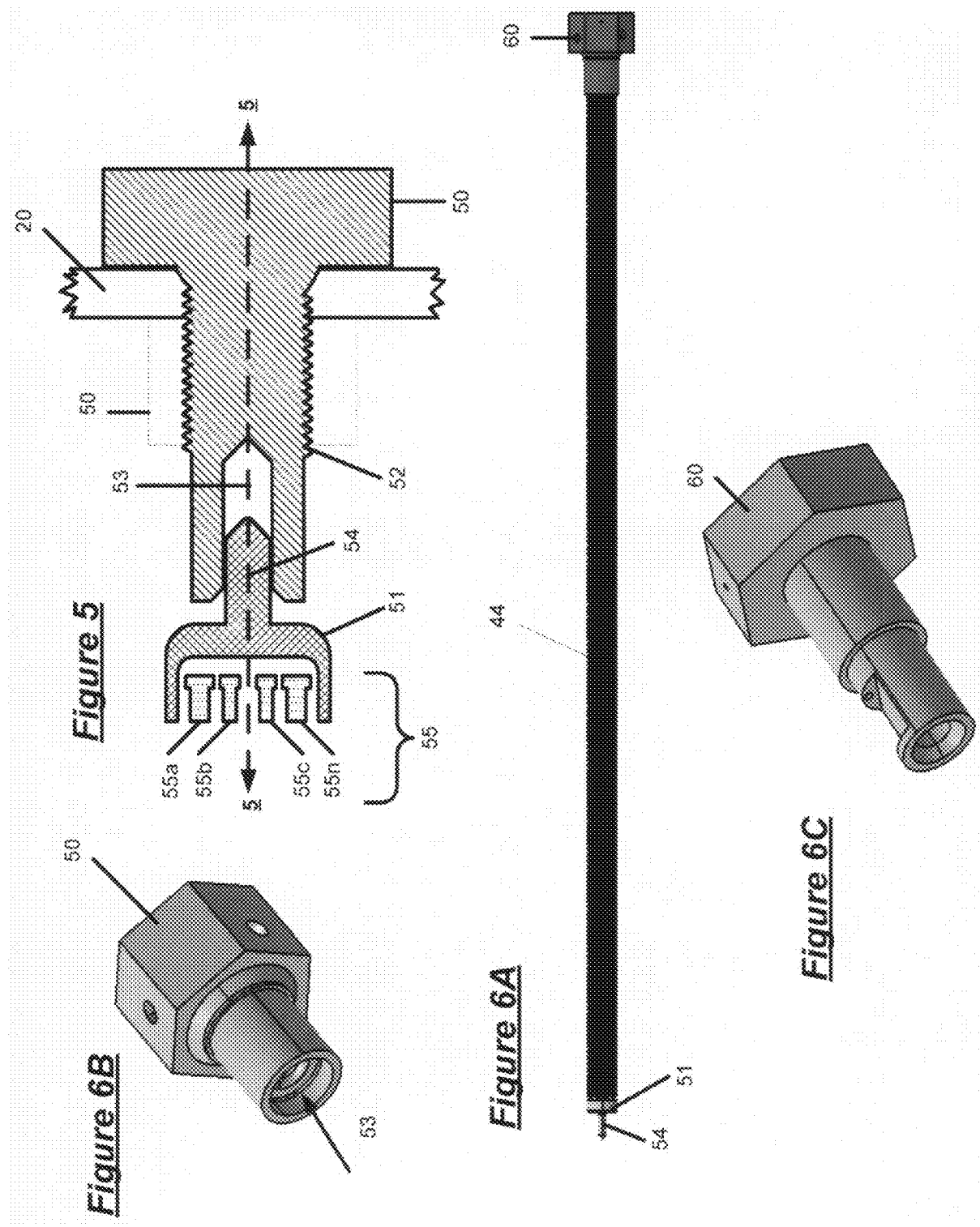

Linear Displacement

Angular Displacement

ATTACHING IN SITU THERMAL MANAGEMENT EQUIPMENT TO HIGH PRESSURE STORAGE TANKS FOR INDUSTRIAL GASES

FIELD OF THE INVENTION

The present invention relates to a system for enhancing the performance of high pressure storage tanks for hydrogen and CNG gas fuel, or any other industrial gas, by compensating for thermal and mechanical stresses caused during the refill, exhaustion, and environmental exposure of the tanks, as well as thermal and mechanical stresses caused by the pressure changes associated with refill and exhaustion of the tanks, and changes in the hot and cold temperature of the ambient environment of the tanks that affect stresses in the tanks.

BACKGROUND OF THE INVENTION

Typically, in motor vehicles using hydrogen, compressed natural gas (CNG), or other gases used to power fuel cells or internal combustion engines, present practice is that fuel is stored in on board tanks maintained at a maximum pressure in the range of about 5000 psi for hydrogen and 3600 psi for CNG. Higher pressures in the range of about 10,000 psi or more are anticipated as the use of hydrogen and CNG becomes more prevalent and tank and compressors are developed for higher pressures. In situ techniques have been developed to manage thermal energy between high pressure gas in a tank and the environment of the tank. Advances in the art of thermal management systems for high pressure gas storage tanks are described in co-pending applications for United States Letters Patent of Kyoshi Handa assigned to Honda Motor Company, LTD: Gas Cooling Methods for High Pressure Fuel Storage Tanks on Vehicles Powered by Compressed Natural Gas or Hydrogen, Ser. No. 11/279,574 filed on Apr. 13, 2006; Pressure Powered Cooling System for Enhancing the Refill Speed and Capacity of On Board High Pressure Vehicle Gas Storage Tanks, Ser. No. 11/380,429 filed on Apr. 27, 2006; Gas Cooling Method Using a Melting/Solidifying Media for High Pressure Storage Tanks for Compressed Natural Gas or Hydrogen, Ser. No. 11/381,005 filed on May 1, 2006; and System for Enhancing the Efficiency of High Pressure Storage Tanks for Compressed Natural Gas or Hydrogen, Ser. No. 11/380,996 filed on May 1, 2006. In the general field of high pressure storage of industrial gases, stress phenomena occur as a result of compression during fill and refill, decompression during consumption and exhaustion of the gas, and changes in the ambient temperature of the environment in which the tank is located.

In the specification herein, reference to tanks adapted to hydrogen powered vehicles also correlates with the use of the invention with CNG (compressed natural gas) powered vehicles and high pressure storage tanks for other industrial gases. As illustrations, hydrogen is referred to in the specification and examples. "Hydrogen" is a term in most instances, however, intended to be interchangeable with CNG and industrial gases; all are referenced as a "gas" or "high pressure gas." The present example of the invention was developed for use in hydrogen and natural gas powered motor vehicle tanks; however, broader application of the technology described herein may include any industrial gas stored under high pressure, including air; hence, the specification is not limited to transportation fuel. In addition to hydrogen fuel cell vehicles, high pressure storage tanks are also elements necessary in the hydrogen internal combustion engine field to which the invention is also applicable.

The present invention is adaptable for high pressure storage of any industrial gas. Although the system described herein was developed for specific application to hydrogen and CNG powered vehicles, there is no limitation inherent to the invention that prevents its use for any industrial pressure vessel filling application. When a high pressure gas storage vessel (or tank) is filled with hydrogen, the gas in the pressurized on storage tank may be characterized as including two forms of energy: chemical energy from the gas itself (consumed in powering the vehicle), and mechanical and thermal energy associated with the high pressure under which the gas is refueled and stored (referred to as Internal Energy, $U$, in thermodynamics).

The thermal energy associated with the gas translates into temperature fluctuations inside and outside the on board tank that, along with pressure variations, cause mechanical stress in the tank system as a result of the expansion and contraction of the physical components that comprise the tank and the in situ devices therein, such as referenced above, that manage thermal energy associated with introducing high pressure gas into a tank during a refill sequence. High pressure itself is also a stress inducing factor in tank components.

During a high pressure refueling process, the interior of the on board tanks (i.e., the refill gas) becomes heated as a result of gas compression (or the transfer of energy from the form of enthalpy, $H$, to internal energy, $U$) as the tank pressure increases and other refueling parameters that affect the process. After refueling, the tank interior temperature and pressure decrease slowly as heat is transferred to the environment through the wall of the tank or as the fuel gas is consumed during vehicle operation. The attainment of a full refill tank pressure generally requires compensation to offset the temperature increase during the course of refueling. In one variation, the charge of fuel input into and stored in the tank, measured by pressure, is initially in excess of the optimum design tank pressure; in another, the gas is pre cooled; in yet another, a slow fill rate is employed. In all instances, mechanical stresses will be induced in the tank components. Relative axial displacement or rotation between an in situ heat exchanger or other thermal management device and a high pressure on board fuel storage tank occurs as a result of stress factors associated with temperature and pressure changes occurring in the tank assembly during fill and exhaustion of gas in the tank. A mechanical compensation system is therefore desirable for stresses induced within the tank and the environment of the tank.

Usually, fill pressures are at 5000 psi or lower. As pressures exceed 3600 psi and 5000 psi, and approach or exceed 10,000 psi, gas cooling, through in situ devices, becomes an important factor in providing a full tank refill in a decreased period of time in the refueling process; and with higher pressures, compensation for thermal and pressure induced stresses assumes more importance. Consequently, there exists a need for systems to manage the physical stresses induced by high pressure fill and exhaustion of on board tanks.

OBJECT OF THE INVENTION

It is an object of the present invention to provide an assembly system to ameliorate stress effects caused by thermal and mechanical differences in high pressure fuel tank or other industrial gas refilling systems.

It is a further object to accommodate the effects of relative axial displacement or rotation between an in situ heat exchanger or other thermal management device and a high pressure on board fuel storage tank as are caused by stress factors associated with temperature and pressure changes occurring in the tank assembly during fill and exhaustion of gas in the tank.

The present invention, accordingly, is intended to enhance the performance of high pressure storage tanks for hydrogen and CNG gas fuel, or any other industrial gas, by compensating for thermal and mechanical stresses caused during the refill, exhaustion, and environmental exposure of the tanks, as well as thermal and mechanical stresses caused by the pressure changes associated with refill and exhaustion of the tanks, and changes in the hot and cold temperature of the ambient environment of the tanks that affect stresses in the tanks.

SUMMARY OF THE INVENTION

The present invention comprises a method, design and system to attach in situ thermal management equipment, such as a heat exchanger, to a high pressure fuel gas storage tank intended for on board vehicle use in a manner which fixes the in situ equipment in the interior of the tank, to the tank, but does not constrain the axial location of the in situ equipment at both ends of the tank, thereby allowing a small amount of longitudinal displacement or axial rotation between the heat exchanger and the tank. A degree of longitudinal movement along the axis of the tank and a degree of rotation, both at either end or each end of the in situ device, are permitted.

The invention is intended to ameliorate sources of relative axial displacement or rotation between the heat exchanger and the tank are caused by factors that include but are not limited to: pressure changes within the heat exchanger and/or within the tank; temperature changes of the heat exchanger and/or of the tank; forces applied to the tank during operation or during parts installation; vibrations encountered during operation; manufacturing variations of the heat exchanger and/or the tank; torque applied to the tank plugs at either end of the tank during or after installation; and creep or relaxation of stresses over time within the heat exchanger or the tank.

In the invention, linear displacement of in situ thermal management equipment along the axis of the tank and angular displacement of in situ thermal management equipment about the central axis of the tank is allowed in a controlled manner to compensate for thermal, mechanical and pressure stress effects. The invention is described more fully in the following description of the preferred embodiment considered in view of the drawings in which:

BRIEF DESCRIPTION OF THE SEVERAL VIEWS OF THE DRAWINGS

FIG. 2 shows an example of an in situ heat pipe device used, with a central heat pipe having absorption fins thereon, to exhaust heat from an on board high pressure gas fuel storage tank. The heat pipe system is secured to the tank at one end only.

FIG. 3 shows an example of a coil and fin system for in situ thermal management disposed within an on board tank interior for connected to a coolant system for the exhaustion of heat. The system is secured to the tank at both ends.

FIG. 5 is a linear cross sectional view along the axis line 5←→5 shown in FIG. 4B.

FIG. 6A, FIG. 6B, FIG. 6C, FIG. 6D, FIG. 6E, and FIG. 6F show elements used in conjunction with the thermal management installation system of the invention.

DETAILED DESCRIPTION OF THE INVENTION

Figure 1:
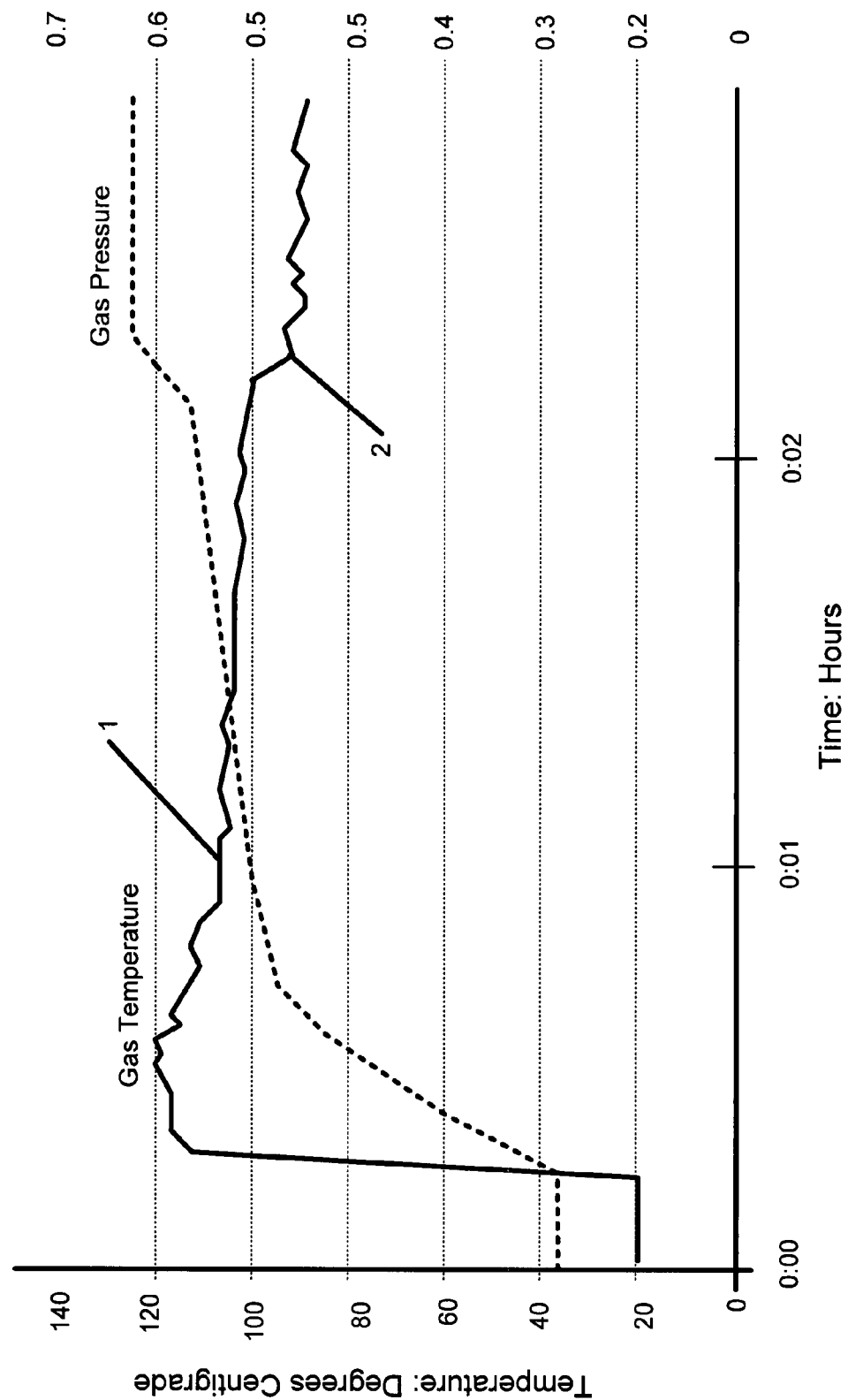
FIG. 1 is a chart of gas temperature T, C°, and relative gas pressure P, plotted against time, derived from a fast fill high pressure test refill of a hydrogen tank showing the relative environmental changes in temperature and pressure to which a typical high pressure gas storage tank is exposed.

Typically, on board vehicle tanks are cylindrical with hemispherical ends and are design capable of storing a charge of high pressure gas at an approximately 5000 psi, and up to 10,000 psi or more maximum rated capacity at a defined temperature. A typical charge by weight of hydrogen for a fuel cell powered vehicle ranges from approximately 1.6 kg to approximately 10 kg. The stress effects with which the invention is concerned, however, are not dependent upon the mass of fuel in the tank. During refueling, the gas in the tank becomes hotter through the change from incoming gas enthalpy to internal energy in the tank, which is sensible through thermal heat, figuratively shown by the arrows in the drawings herein by the symbols →, →, →, etc., except for cross section depictions. High pressure storage tanks for vehicle use are typically formed from strongly reinforced carbon fiber and include a plastic or other liner and bosses at one or either end.

In the tank, temperature increases with high incoming gas compression and incoming gas temperature; as a practical matter, the maximum allowable design temperature or pressure in an on board tank may preclude a full refill if the on board tank design temperature or pressure is exceeded in an overfill attempt. FIG. 1 is a chart of gas temperature T, C° 1, and relative gas pressure P, 2 plotted against time, derived from a fast fill high pressure test refill of a hydrogen tank showing the relative environmental changes in temperature and pressure to which a typical high pressure gas storage tank is exposed. Thus the need for thermal management of the fill, or refill gas, is presented. The system of the invention provides a system for managing physical stress within a high pressure tank and an in situ thermal management system.

In the example of FIG. 2, an in situ heat pipe device 23 is used, with a central heat pipe having absorption fins thereon, to exhaust heat from an on board high pressure gas fuel storage tank 20. Gas inlet 21, associated with valve V1, and gas outlet valve 22, associated with valve V2, are shown in a system with heat pipe exit 24 leading to radiator 25 secured to the tank 20 boss at one end only. FIG. 3 shows an example of a coil and fin system for in situ thermal management 30 disposed within an on board tank 20 for connection to a coolant system for the exhaustion of heat from the tank. Gas inlet valve V1 and gas outlet V2 are shown, respectively associated with control valves CV1 and CV2 in the tank boss 31 at one end. The system is secured to the tank at both ends. At the end of the tank opposite the inlet/outlet side at boss 31, the end cap or opposing boss 32 with a recessed interior 33 for receiving an end 34 of the thermal management piping system. Inside threads in the end cap 35 are cooperative with exterior threads 36 and locking nut 36 on a screw in fixture 37 to maintain the assembly 30 in a fixed position within the tank 20.

In the invention, in situ thermal management equipment is disposed within an on board high pressure fuel gas storage tank or other industrial gas tank wherein the in situ equipment is installed in the interior of the tank along the central axis thereof. The thermal management device comprises a stem and a receptacle at the respective ends thereof such that the stem is inserted into a receptacle affixed to one tank end such that longitudinal displacement and axial rotation between the in situ equipment and the tank is permitted. In a variation, longitudinal movement of the in situ device is permitted along the axis of the tank and a degree of rotation of the in situ device is permitted at one end of the tank. The in situ device is fixedly attached to the end of the tank opposite the end including the stem and receptacle. The stem and receptacle may also be disposed at both ends of the tank such that longitudinal movement of the in situ device is permitted along the axis of the tank and a degree of rotation of the in situ device is permitted at both ends of the tank.

FIG. 4 shows a typical high pressure gas storage tank 20 with bosses 41 and 42 at opposing ends. Tank liner 43 and thermal management system 44 are also shown. FIG. 5A shows an example of an end cap configuration utilized in end cap 41, wherein FIG. 5B and FIG. 5C depict, respectively, the dimensional linear displacement and the dimensional angular displacement permitted for the in situ apparatus 44 along the linear axis of the in situ thermal management device centrally positioned within the tank. Of the three physical axes possible, movement of the device 44 at the end cap 41 is allowed in one axis linearly and one axis angularly. The end cap for the longitudinal cross sectional view along the axis defined by 5→ ←5 shown in FIG. 4A is depicted in a cross section in FIG. 5. In FIG. 5, the threaded 52 end cap 50a cooperative with boss element 50b (together referenced as 50) includes a female end receptacle opening 53 for receiving the male extension 54 of the end cap 51 of a typical heat management apparatus wherein tubing or piping ends 55 a, 55b, 55c and 55n are joined in a piping manifold for the apparatus.

Figure 6F:
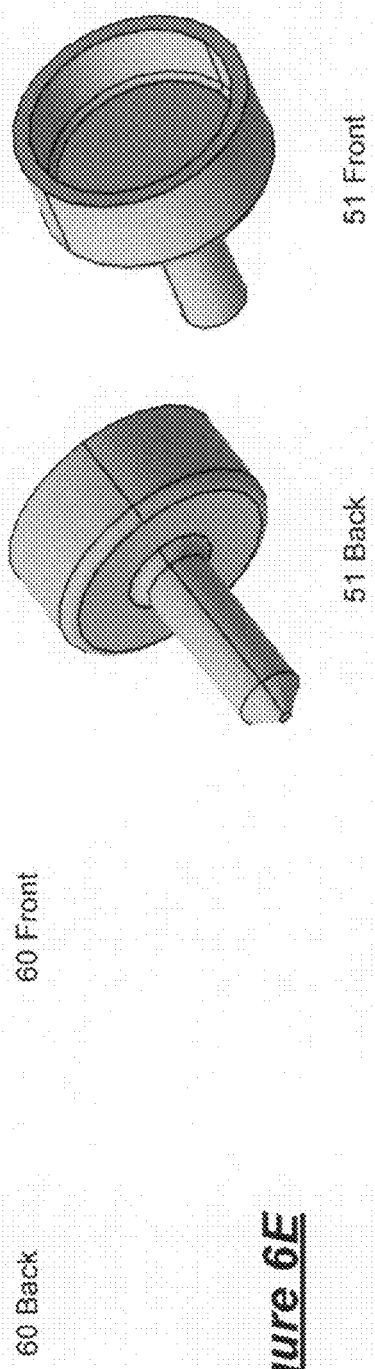
Figure 7A:
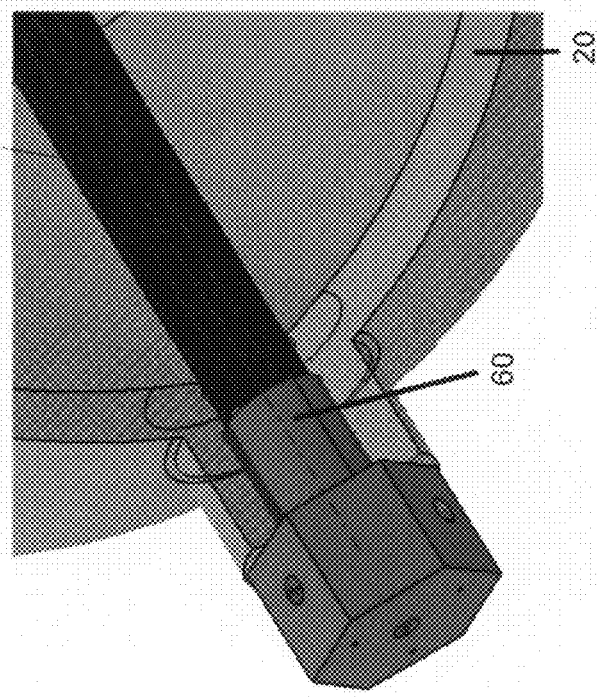
FIG. 7A depicts, at one end of the tank, the fixing of the thermal system to the tank by a threaded connection, or some other manner that secures the system tightly to one end of the tank. At one end of the tank 20, the connection rigidly constrains movement of one end of thermal management apparatus 44 in all axes as shown in FIG. 7B and FIG. 7C.
Figure 7B:
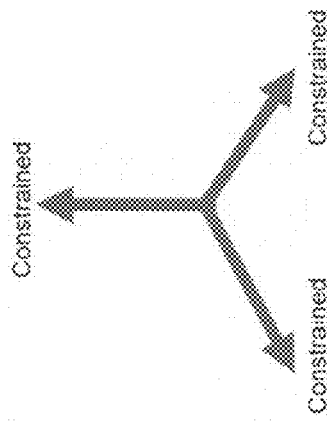
Figure 7C:
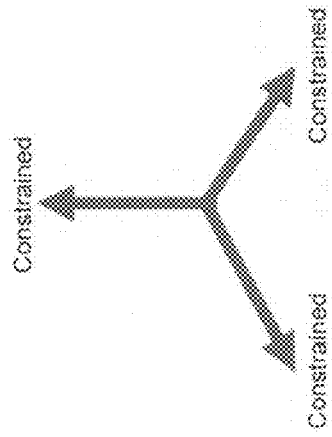

FIG. 6A shows a typical in situ system for installation on the center axis of a tank wherein 44 is the thermal management system, 60 is the end junction for fixing the system in an immobile manner to one end of the tank; segments of the system at 51 and 54 correspond to the like numbered extension and cap shown and explained above with reference to FIG. 5. FIG. 6C shows a detail of fixed end receptacle for the opposite end of the tubing system of the in situ device. FIG. 7A, FIG. 7B, FIG. 7C, FIG. 7D, FIG. 7E, and FIG. 7F show elements used in conjunction with the thermal management installation system of the invention. FIG. 7A depicts, at one end of the tank 20, the fixing of the end segment 60 of the thermal system 44 to the tank by a threaded connection, or some other manner that secures the system tightly to one end of the tank. The connection rigidly constrains movement of the thermal management apparatus installed at one end of the tank in all degrees of freedom shown in FIG. 7B and FIG. 7C.

Figure 4C:
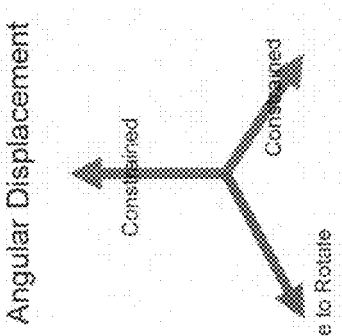
FIG. 4B shows an example of an end cap configuration utilized in the invention and FIG. 4C and FIG. 4D depict, respectively, the linear displacement and the angular displacement permitted for the in situ apparatus along the axis in the in situ thermal management device.
Figure 4D:
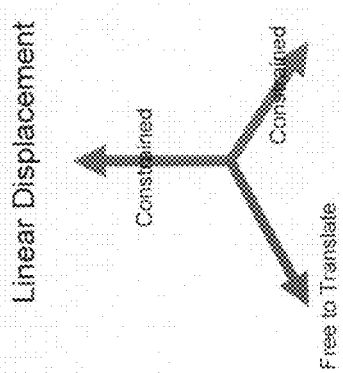
Figure 4A:
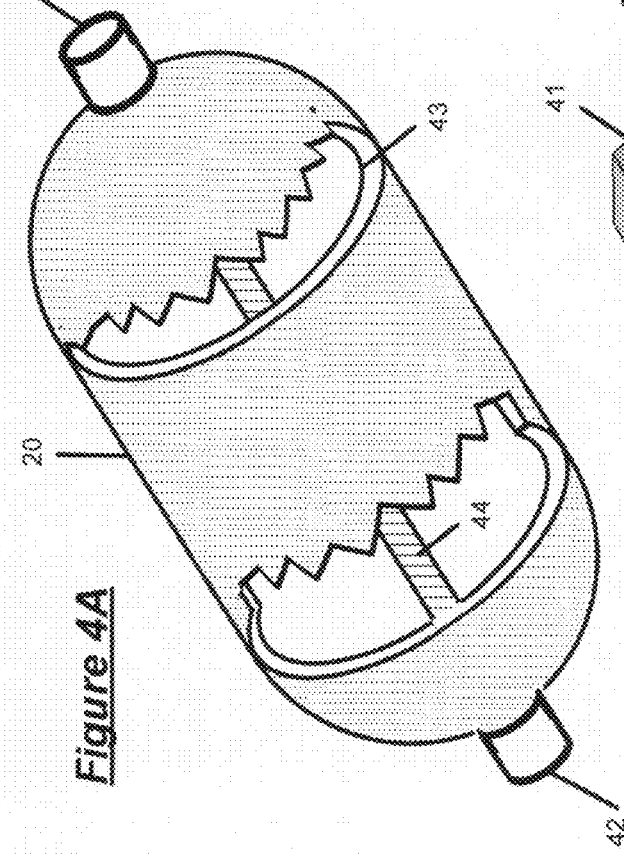
FIG. 4a shows a typical high pressure gas storage tank.
Figure 4B:
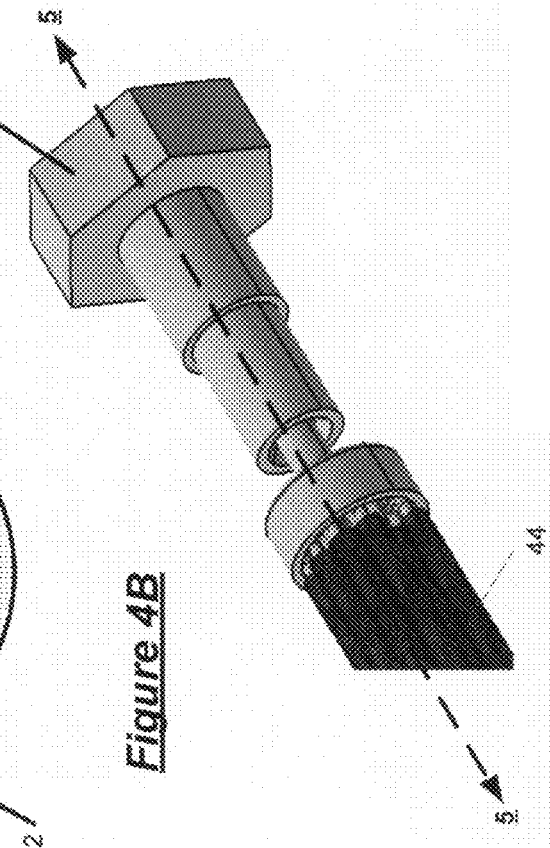
Figure 6D:
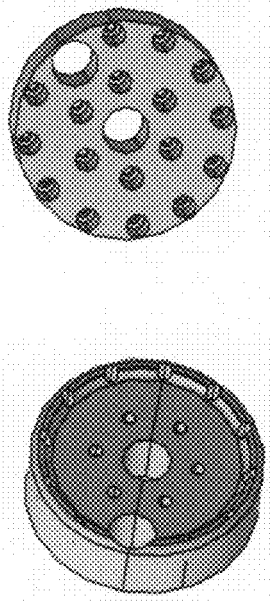
Figure 6E:
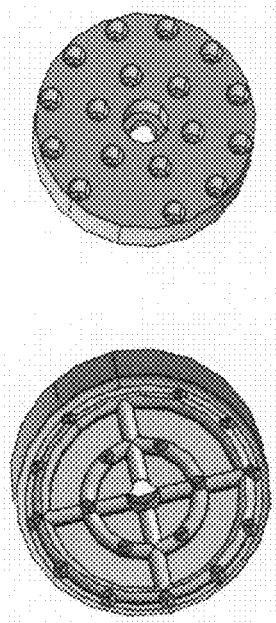

Thus, a typical gas storage tank and in situ thermal management system in accordance with the invention is comprised of the following parts, shown variously by the reference numerals in the drawing figures: A high pressure gas storage tank 20 in FIG. 4A; the in situ thermal management system 44 in FIG. 4A comprising an assembly of multiple parts dependent on the thermal system design such as shown at 23 and 30 respectively in FIG. 2 and FIG. 3; port plugs for the opposite ends of the tank 41 (fixed, as shown in FIG. 4A) and 50 (a compensatorial end cap as shown in FIG. 4B and FIG. 5); a return manifold 51 for gas circulation such as shown in FIG. 6F; heat exchanger caps 55 shown front and back in FIG. 6E; an entry or inlet-outlet manifold 60, shown front and back in FIG. 6D; and stem 54 in the return cap assembly shown in FIG. 5. A system for attaching in situ thermal management equipment is thus provided which fixes the in situ equipment in the interior of the tank, to the tank, but does not constrain the axial location of the in situ equipment, thereby allowing a small amount of longitudinal displacement or axial rotation between the heat exchanger and the tank. A degree of longitudinal movement along the axis of the tank and a degree of rotation is effected, both singularly at either end of the in situ device or dually at each end of the in situ device positioned within the tank.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. Equipment for managing physical stress caused by thermal changes associated with the refill and exhaustion of gas in a high pressure storage tank comprising:
   a cylindrical tank having hemispherical shaped ends at each longitudinal end of the cylinder;
   a fixed boss fitting disposed at the center of each longitudinal end of the cylinder;
   an in situ heat exchange device installed between the interior end sections of the interior of the tank along the central longitudinal axis of the tank and being secured within the tank by the boss fittings disposed at the longitudinal ends of the tank, the in situ heat exchange device including gas flow channels for management of the thermal properties of the gas therein;
   one end of the in situ device having a stem segment extending longitudinally along the longitudinal axis of the device;
   a boss at the end of the cylinder having a receptacle for receiving the end stem of the in situ device;
   the stem and receptacle having a relationship such that the stem fits within the receptacle with a mechanical tolerance allowing longitudinal displacement and axial rotation between the in situ device and the tank.

2. The equipment of claim 1 wherein longitudinal movement of the in situ device is permitted along the axis of the tank and a degree of rotation of the in situ device is permitted at one end of the tank.

3. The equipment of claim 1 wherein the in situ device is secured to a boss at one end of the tank.

4. The equipment of claim 1 wherein a stem is disposed at each end of the in situ device and receptacles cooperative with the stems are disposed at bosses at both ends of the tank and longitudinal movement of the in situ device is permitted along the axis of the tank and a degree of rotation of the in situ device is permitted at both ends of the tank.

5. Equipment for managing physical stress caused by thermal changes associated with the refill and exhaustion of gas in a high pressure storage tank comprising:
   a cylindrical tank having hemispherical shaped ends at each longitudinal end of a middle cylinder;
   a fixed boss fitting disposed at the center of each longitudinal end of the tank;
   an in situ heat exchange device installed between the interior end sections of the interior of the tank along the central longitudinal axis of the tank and being secured within the tank by the boss fittings disposed at the longitudinal ends of the cylinder, the in situ heat exchange device including gas flow channels for management of the thermal properties of the gas therein;

the in situ device further including a piping manifold for gas flow within the device, the manifold being circumferentially disposed around the in situ device and having an operative interconnection with a thermal management system for the refill and exhaustion of gas into and from the tank, the manifold disposed within a circumferential enclosure closed at one end whereby a stem extends from the closed end of the manifold enclosure;

a boss at the end of the cylinder having a receptacle for receiving the stem end of the in situ device;

the stem and receptacle having a relationship such that the stem fits within the receptacle with a mechanical tolerance allowing longitudinal displacement and axial rotation between the in situ device and the tank.

6. Equipment for managing physical stress caused by thermal changes associated with the refill and exhaustion of gas in a high pressure storage tank comprising:

a cylindrical tank having hemispherical shaped ends at each longitudinal end of a middle cylinder;

fixed boss fittings disposed at the center of each longitudinal end of the tank;

an in situ heat exchange device installed between the interior end sections of the interior of the tank along the central longitudinal axis of the tank and being secured within the tank by the boss fittings disposed at the longitudinal ends of the tank, the in situ device including gas flow channels for management of the thermal properties of the gas therein;

the in situ device further including piping manifolds for gas flow within the device, the manifolds being circumferentially disposed around the in situ device and having an operative interconnection with a thermal management system for the refill and exhaustion of gas into and from the tank, the manifold disposed within a circumferential enclosure closed at one end whereby a stem extends from the closed end of the manifold;

the bosses at each end of the cylinder each having a receptacle for receiving the stems at each end of the in situ device;

the stem and receptacle having a relationship such that the stem fits within the receptacle with a mechanical tolerance allowing longitudinal displacement and axial rotation between the in situ device and the tank.

* * * * *